US008268103B2

(12) United States Patent
Till

(10) Patent No.: US 8,268,103 B2
(45) Date of Patent: Sep. 18, 2012

(54) METHOD AND APPARATUS FOR THE CIRCUMFERENTIAL LABELING OF A RUN OF BLOW MOLDED CONTAINERS OR BOTTLES WHERE THE INDIVIDUAL CONTAINERS OR BOTTLES IN THE RUN HAVE AT LEAST ONE VARYING DIMENSION DUE TO MANUFACTURING TOLERANCES, THE METHOD AND APPARATUS PROVIDING MORE CONSISTENT LABELING OF INDIVIDUAL CONTAINERS OR BOTTLES IN THE RUN OF CONTAINERS OR BOTTLES

(75) Inventor: Volker Till, Hofheim am Taunus (DE)

(73) Assignee: KHS GmbH, Dortmund (DE)

( * ) Notice: Subject to any disclaimer, the term of this patent is extended or adjusted under 35 U.S.C. 154(b) by 255 days.

(21) Appl. No.: 12/355,870

(22) Filed: Jan. 19, 2009

(65) Prior Publication Data

US 2010/0012252 A1 Jan. 21, 2010

Related U.S. Application Data

(63) Continuation-in-part of application No. PCT/EP2007/007190, filed on Aug. 15, 2007.

(30) Foreign Application Priority Data

Aug. 16, 2006 (DE) ......................... 10 2006 038 249

(51) Int. Cl.
*B32B 41/00* (2006.01)

(52) U.S. Cl. ................. 156/64; 53/296; 53/297; 53/298

(58) Field of Classification Search .................... 156/64, 156/353, 354, 355, 360, 361, 362, 363, 364, 156/366, 367, 378, 379, 384, 387; 53/296, 53/297, 298

See application file for complete search history.

(56) References Cited

U.S. PATENT DOCUMENTS

| | | | | |
|---|---|---|---|---|
| 2,751,735 | A * | 6/1956 | Bartlett et al. | 53/292 |
| 4,384,500 | A * | 5/1983 | Friberg | 83/74 |
| 6,488,066 | B1 * | 12/2002 | Frey | 156/384 |
| 2004/0050273 | A1 * | 3/2004 | Hansburg | 101/227 |
| 2005/0045263 | A1 | 3/2005 | Heuft et al. | |
| 2006/0037706 | A1 | 2/2006 | Putzer | |
| 2006/0260755 | A1 * | 11/2006 | Crum | 156/519 |

FOREIGN PATENT DOCUMENTS

| | | |
|---|---|---|
| CH | 692 567 | 8/2002 |
| CN | 2505410 Y | 8/2002 |

(Continued)

OTHER PUBLICATIONS

International Search Report PCT/EP2007/007190 and English translation thereof.

(Continued)

*Primary Examiner* — George Koch
(74) *Attorney, Agent, or Firm* — Nils H. Ljungman & Associates

(57) ABSTRACT

A method and apparatus for the circumferential labeling containers where the individual containers may have at least one varying dimension, due to manufacturing tolerances. The method and apparatus may provide more consistent labeling of individual containers in the run of containers.

17 Claims, 5 Drawing Sheets

FOREIGN PATENT DOCUMENTS

| | | | |
|---|---|---|---|
| DE | 198 32 548 | | 1/2000 |
| DE | 101 15 543 | | 10/2002 |
| DE | 20 2006 000214 | | 4/2006 |
| EP | 1 038 782 | | 9/2000 |
| EP | 1 621 465 | | 2/2006 |
| WO | WO 2004/0020292 | * | 3/2004 |
| WO | WO 2004/0056658 | * | 7/2004 |

OTHER PUBLICATIONS

Chinese Office Action 200780030390.5, 2010.
English translation of Chinese Office Action 200780030390.5, 2010.

* cited by examiner

METHOD AND APPARATUS FOR THE CIRCUMFERENTIAL LABELING OF A RUN OF BLOW MOLDED CONTAINERS OR BOTTLES WHERE THE INDIVIDUAL CONTAINERS OR BOTTLES IN THE RUN HAVE AT LEAST ONE VARYING DIMENSION DUE TO MANUFACTURING TOLERANCES, THE METHOD AND APPARATUS PROVIDING MORE CONSISTENT LABELING OF INDIVIDUAL CONTAINERS OR BOTTLES IN THE RUN OF CONTAINERS OR BOTTLES

CONTINUING APPLICATION DATA

This application is a Continuation-In-Part application of International Patent Application No. PCT/EP2007/007190, filed on Aug. 15, 2007, which claims priority from Federal Republic of Germany Patent Application No. 10 2006 038 249.8, filed on Aug. 16, 2006. International Patent Application No. PCT/EP2007/007190 was pending as of the filing date of this application. The United States was an elected state in International Patent Application No. PCT/EP2007/007190.

BACKGROUND

1. Technical Field

The present application relates to a method and apparatus for the circumferential labeling of a run of blow molded bottles where the individual bottles in the run have at least one varying dimension due to manufacturing tolerances, the method and apparatus providing more consistent labeling of individual containers in the run of containers.

2. Background Information

Background information is for informational purposes only and does not necessarily admit that subsequently mentioned information and publications are prior art.

This present application relates to a method for the circumferential labeling of containers, for example for the wraparound labeling of bottles, in which an endless strip of labels is printed, the respective label is cut to the desired length and wrapped around the container. As used in the context of this present application, the term "endless label strip" does not necessarily means a strip of labels with a theoretically endless length, but a strip of labels which has a length which is at least equal to the length of two connected labels that must or should consequently be cut apart or separated, or in any case cut to the proper length, to produce the individual desired labels.

In some methods, film labels are used which are separated by a laser beam generator from a continuously or substantially continuously fed endless strip. The labels manufactured in this manner are generally coated with glue and are then deposited on the container in question and wrapped around the container.

Some methods describe wraparound labels made of a shrinkable label material. The individual label is pulled in the necessary or desired length off a strip of label material which serves as backing. The length of label material pulled off the strip is then formed into the wraparound label and connected to the bottle, as well as being removed from the backing. The wraparound label formed in this manner is then brushed onto the container, where it is fixed in position by shrinking.

The latter method described above is complicated and expensive in terms of the equipment required and/or desired, and is not always reliable or may not be reliable on account of the shrinking process involved. In the former process described above, it is worth noting that to achieve a secure wraparound labeling, the labels must or should practically always or substantially always be processed with an overlapping area, whereby—to prevent, restrict, and/or minimize unnecessary or undesirable visual irregularities—this overlapping area is generally realized in a single color, although that imposes restrictions on the graphic design of the label.

This restriction is undesirable from an aesthetic point of view. An overlapping area also unnecessarily undesirably increases the consumption of material.

Quite apart from the above limitations, with some solutions it may be impracticable to flexibly and variably provide bottles that have different shapes with a label.

In practice, bottles often vary in terms of their diameter, so that the use of labels without a single-color overlapping area on bottles that have different diameters leads to different overall visual impressions, and in no case can a constant or substantially constant, consistent or substantially consistent, identical appearance be achieved. This is one of the disadvantages that is eliminated, restricted, and/or minimized by this present application.

OBJECT OR OBJECTS

An object of the present application is to develop a method for the circumferential labeling of containers of the type described above so that the use of roll-feed labels becomes possible, in one possible embodiment for the wraparound labeling of containers without any overlapping area. An additional object of the present application is to achieve for example a visually attractive labeling with a reduced consumption of material at lower cost that also takes different container shapes into consideration.

SUMMARY

To accomplish this object, the present application teaches, on the basis of a generic method for the circumferential labeling of containers, that the circumference of each containers to be labeled is determined, artwork that is present in digital form is then adapted to the specified length of the label that has been determined and the printed label is then cut off in the correct length.

In the context of the present application, the artwork generates a printed image on the endless strip by means of a print head. Conventional printing technologies such as the ink jet method, transfer printing, laser printing, etc. can be used for this purpose. The external dimensions for the label are determined by means of the pattern. In the context of the present application, both the artwork and the pattern are easy provided with angle marks.

These angle marks take into consideration the fact that the printed image derived from the artwork as well as the label itself must or should extend over a certain circumferential area of the containers, in one possible embodiment over the entire circumference of the container.

Generally the label covers a circular arc or an individual segment of a circular arc. It goes without saying that the artwork or the image and the label can also each be wrapped all the way or substantially all the way around the container or applied to the container and can thus generate a wraparound label. This wraparound label does not have any overlapping area, at least within its graphic design, so that a uniquely attractive visual quality is achieved. Depending on the specific embodiment of this present application, the wraparound label can also be realized so that it does not have any areas where it physically overlaps, so that the two ends of the label are in one possible embodiment located seamlessly next to one another and without any join.

Basically, the present application accomplishes these objects because both the artwork and the label, on the basis of their design and specifications, each correspond to a specified length in the circumferential direction or the longitudinal direction, although in the context of the present application their length in the circumferential direction is varied by the division into angular segments as a function of the measured diameter of the container. The artwork as well as the label thereby both extend over the desired angular area, ultimately regardless of whether and how the circumference of the container may vary from container to container.

With the present application it is therefore possible for the first time to provide bottles that have different diameters or diameter tolerances with an unchanging label that produces the same overall visual impression, and in one possible embodiment to perform a wraparound labeling which eliminates an overlapping of the label ends or at least an overlapping area in the graphic design.

On account of the manufacturing tolerances, which are almost inevitable in the manufacturing processes for containers and the related dimensional inconsistencies, even the containers of a single manufacturing lot have diameters, circumferences and/or heights that differ from one container to another. These fluctuations in dimensions or size in a run of containers, blow molded bottles for example, my be on the order of magnitude of +/−3%. For example, for a lot of 85 mm diameter containers, the minimum dimension for the circumference may be 259 mm and the maximum dimension may be 275 mm. Depending upon the batches of materials used to manufacture the PET bottles, for example, and the conditions and process used the tolerances may be greater or smaller then those indicated, supra, and could vary by tenths or hundredths of a percent of the tolerances indicated above and even may be greater by possibly a percent. All ranges may vary in tenths or hundreths of a percent within the ranges indicated herein. Aspects of the present disclosure may prevent the negative influences on the appearance or aesthetic nature of the labeled container caused by these variations of the circumference. Aspects of the present disclosure may also save label material as each individual label may be sized for each container to not overlap or abut, saving excess overlapping label material.

It should also be emphasized that the artwork and/or the pattern can be provided not only with angle marks in the peripheral direction of the container, but also in the direction of the vertical axis of the respective container. In that case, the present application not only allows for an increase or decrease of the artwork and/or of the pattern in the peripheral direction of the container but also in the direction of its vertical axis. It thereby becomes possible, for example, to take variable and differing bottles lengths into consideration.

It has also been found to be possible if the artwork and/or the pattern for the respective label can be stored in a control unit where it is provided with the angle marks in question. Naturally it can also be provided with different angle marks on one side for the artwork and on the other side for the pattern. For example, it is conceivable to divide the artwork into segments of twenty degrees of arc each, while the pattern is based on forty-drive degree arc segments. Both the artwork and the pattern are first identified in their longitudinal direction, i.e. in the peripheral direction after application to the container, with the angular area zero degrees to three hundred sixty degrees. In other words, the longitudinal component is replaced by the corresponding angle values.

Otherwise, the design is generally realized so that the artwork completely or partly fills up the respective pattern and is therefore generally designed so that it smaller than the pattern. Generally, the artwork is applied by means of the above mentioned print head in the form of a printed image on the endless label strip, whereby the print head is at a fixed, specified distance from the label strip. In one possible embodiment, the distance of the print head from the label strip can be set and regulated.

It has also been found to be successful if the artwork and/or the label are applied to the container individually or together without any overlap. This method is an elegant solution to the problem because the artwork and the pattern are each oriented with the angle marks so that the label can be applied to the container as a function of the angle.

The artwork and the pattern are each applied to the container perpendicular or virtually perpendicular to the circumferential direction, in accordance with their respective dimensions in the direction of the vertical axis. Depending on the size and shape of the container, the artwork can be applied to the container with different distances between individual dots or pixels in the peripheral direction and/or in the direction of the vertical axis. It has also been found to be successful if the distance in question between the dots or pixels can be set at a fixed or variable distance in the circumferential direction and/or in the direction of the vertical axis.

An additional object of the present application is an apparatus which is in one possible embodiment suitable for the circumferential labeling of containers, as well as a container which is provided with a corresponding label which is manufactured according to the method described herein. Finally, it goes without saying that it is also within the teaching of the present application to apply the individual label and/or the artwork or the printed image in a spiral pattern or even in a meandering pattern or in any other manner to the circumference of the respective container.

The above-discussed embodiments of the present invention will be described further herein below. When the word “invention” or “embodiment of the invention” is used in this specification, the word “invention” or “embodiment of the invention” includes “inventions” or “embodiments of the invention”, that is the plural of “invention” or “embodiment of the invention”. By stating “invention” or “embodiment of the invention”, the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present application is described in greater detail below with reference to one possible embodiment which is illustrated in the accompanying drawing, in which.

DESCRIPTION OF EMBODIMENT OR EMBODIMENTS

Figure 1:
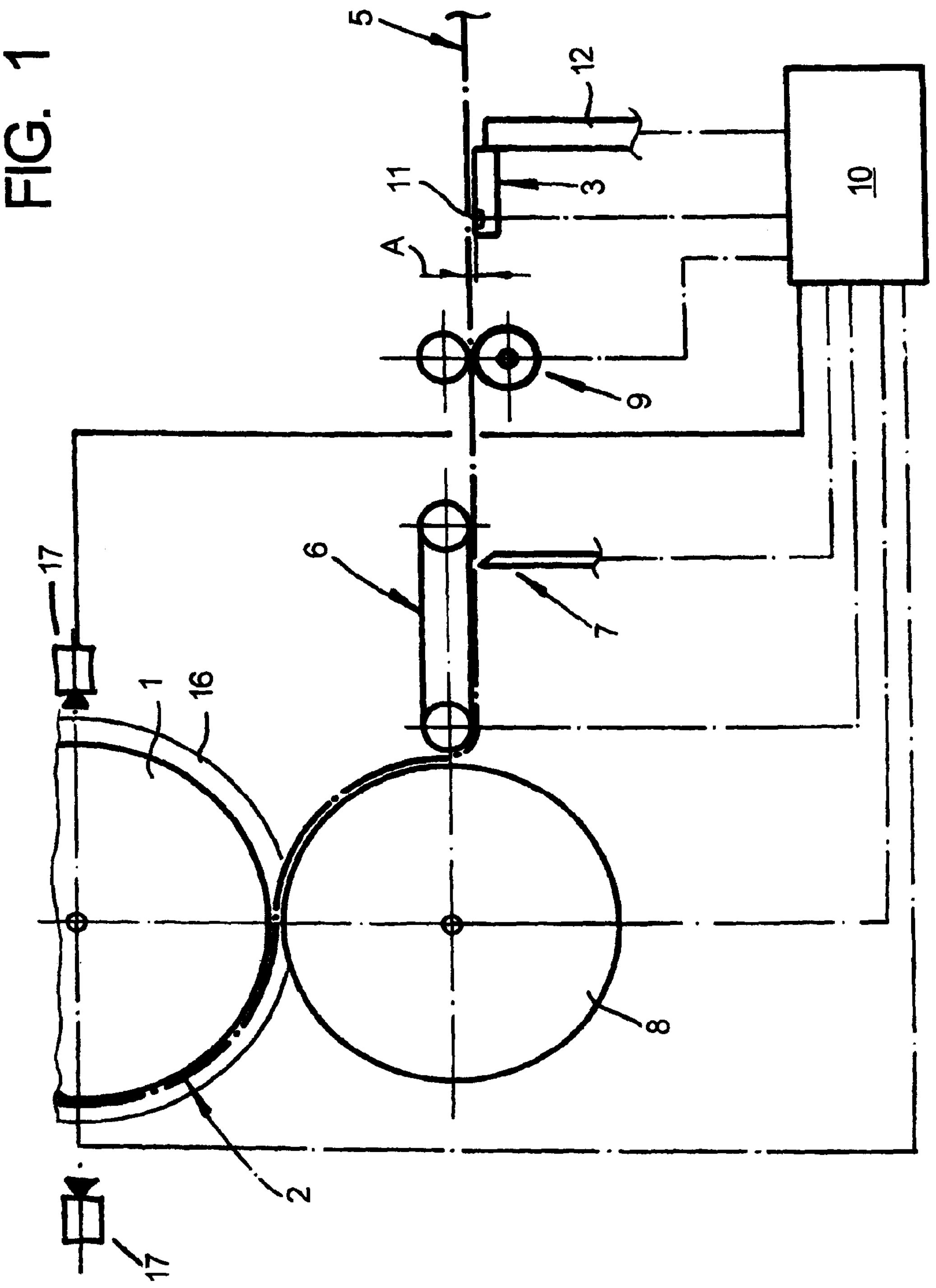
FIG. 1 shows an apparatus for the circumferential labeling of containers, in one possible embodiment of bottles.
Figure 1A:
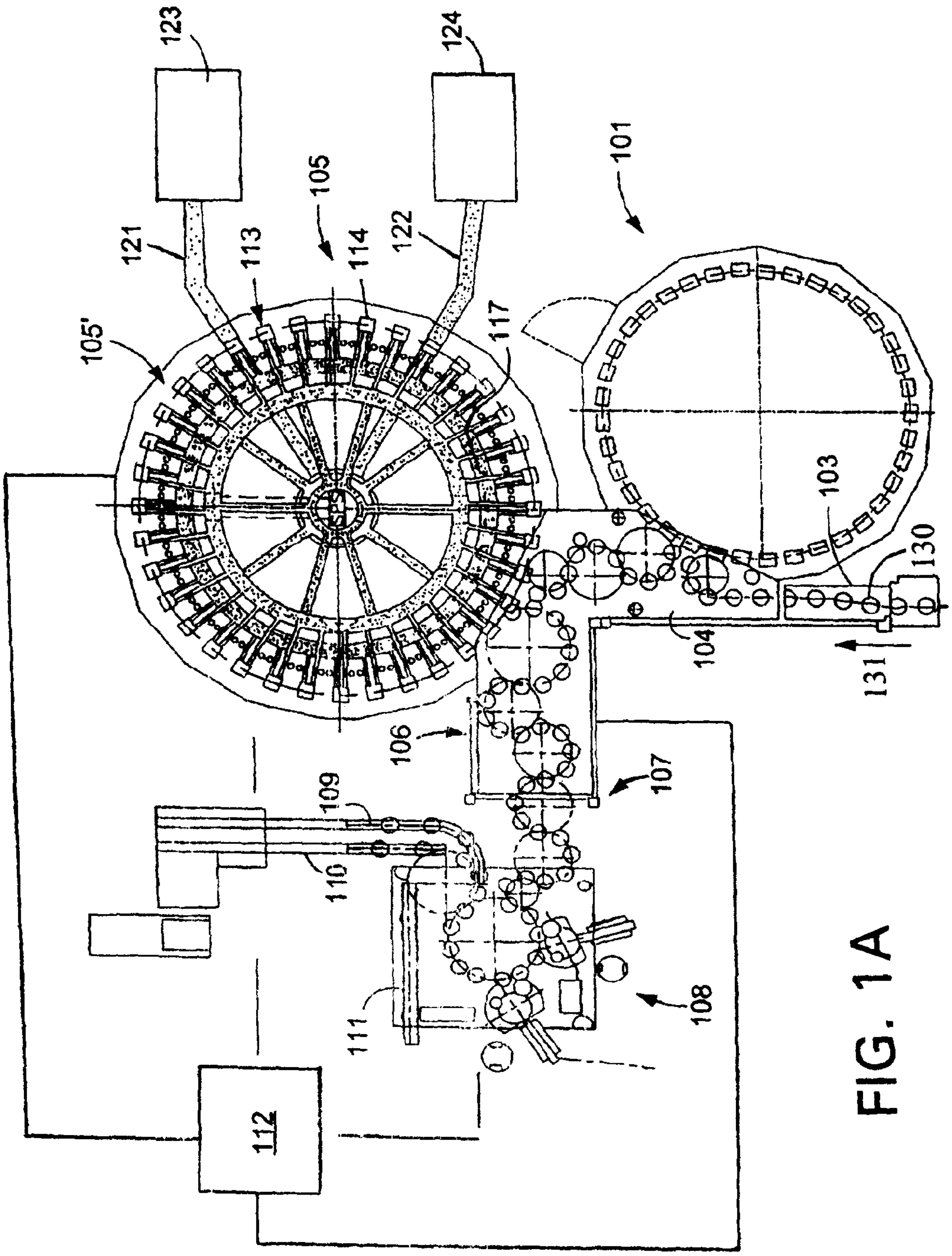
FIG. 1A shows schematically the main components of one possible embodiment example of what may be a typical system for filling containers.

FIG. 1A shows schematically the main components of one possible embodiment example of a system for filling containers, specifically, a beverage bottling plant for filling bottles 130 with at least one liquid beverage, in accordance with at least one possible embodiment, in which system or plant could possibly be utilized at least one aspect, or several aspects, of the embodiments disclosed herein.

FIG. 1A shows a rinsing arrangement or rinsing station 101, to which the containers, namely bottles 130, are fed in the direction of travel as indicated by the arrow 131, by a first conveyor arrangement 103, which can be a linear conveyor or a combination of a linear conveyor and a starwheel. Downstream of the rinsing arrangement or rinsing station 101, in the direction of travel as indicated by the arrow 131, the rinsed bottles 130 are transported to a beverage filling machine 105 by a second conveyor arrangement 104 that is formed, for example, by one or more starwheels that introduce bottles 130 into the beverage filling machine 105.

The beverage filling machine 105 shown is of a revolving or rotary design, with a rotor 105', which revolves around a central, vertical machine axis. The rotor 105' is designed to receive and hold the bottles 130 for filling at a plurality of filling positions 113 located about the periphery of the rotor 105'. At each of the filling positions 103 is located a filling arrangement 114 having at least one filling device, element, apparatus, or valve. The filling arrangements 114 are designed to introduce a predetermined volume or amount of liquid beverage into the interior of the bottles 130 to a predetermined or desired level.

The filling arrangements 114 receive the liquid beverage material from a toroidal or annular vessel 117, in which a supply of liquid beverage material is stored under pressure by a gas. The toroidal vessel 117 is a component, for example, of the revolving rotor 105'. The toroidal vessel 117 can be connected by means of a rotary coupling or a coupling that permits rotation. The toroidal vessel 117 is also connected to at least one external reservoir or supply of liquid beverage material by a conduit or supply line. In the embodiment shown in FIG. 1A, there are two external supply reservoirs 123 and 124, each of which is configured to store either the same liquid beverage product or different products. These reservoirs 123, 124 are connected to the toroidal or annular vessel 117 by corresponding supply lines, conduits, or arrangements 121 and 122. The external supply reservoirs 123, 124 could be in the form of simple storage tanks, or in the form of liquid beverage product mixers, in at least one possible embodiment.

As well as the more typical filling machines having one toroidal vessel, it is possible that in at least one possible embodiment there could be a second toroidal or annular vessel which contains a second product. In this case, each filling arrangement 114 could be connected by separate connections to each of the two toroidal vessels and have two individually-controllable fluid or control valves, so that in each bottle 130, the first product or the second product can be filled by means of an appropriate control of the filling product or fluid valves.

Downstream of the beverage filling machine 105, in the direction of travel of the bottles 130, there can be a beverage bottle closing arrangement or closing station 106 which closes or caps the bottles 130. The beverage bottle closing arrangement or closing station 106 can be connected by a third conveyor arrangement 107 to a beverage bottle labeling arrangement or labeling station 108. The third conveyor arrangement may be formed, for example, by a plurality of starwheels, or may also include a linear conveyor device.

In the illustrated embodiment, the beverage bottle labeling arrangement or labeling station 108 has at least one labeling unit, device, or module, for applying labels to bottles 130. In the embodiment shown, the labeling arrangement 108 has three output conveyor arrangement: a first output conveyor arrangement 109, a second output conveyor arrangement 110, and a third output conveyor arrangement 111, all of which convey filled, closed, and labeled bottles 130 to different locations.

The first output conveyor arrangement 109, in the embodiment shown, is designed to convey bottles 130 that are filled with a first type of liquid beverage supplied by, for example, the supply reservoir 123. The second output conveyor arrangement 110, in the embodiment shown, is designed to convey bottles 130 that are filled with a second type of liquid beverage supplied by, for example, the supply reservoir 124. The third output conveyor arrangement 111, in the embodiment shown, is designed to convey incorrectly labeled bottles 130. To further explain, the labeling arrangement 108 can comprise at least one beverage bottle inspection or monitoring device that inspects or monitors the location of labels on the bottles 130 to determine if the labels have been correctly placed or aligned on the bottles 130. The third output conveyor arrangement 111 removes any bottles 130 which have been incorrectly labeled as determined by the inspecting device.

The beverage bottling plant can be controlled by a central control arrangement 112, which could be, for example, computerized control system that monitors and controls the operation of the various stations and mechanisms of the beverage bottling plant.

The figures show an apparatus which is suitable for the circumferential labeling of containers 1, in this case bottles 1, and in one possible embodiment beverage bottles. Using the apparatus which is described in greater detail below, a label or wraparound label 2 is applied to the bottle 1, and in one possible embodiment without any overlap. Of course, an apparatus of this type can also be used to apply a label 2 that does not extend fully around the periphery.

As illustrated in FIG. 1, the apparatus in question, in its basic construction, has at least one sensor device 17 with which the diameter of each container to be labeled is determined directly or indirectly, with the use of a suitable computer device such as the control device 10, for example.

This sensor device can be a photoelectric barrier, for example, which takes into consideration the translation speed of the containers and determines their diameter and thus their circumference. Measurement systems using laser beams can also be employed, and/or additional methods that will be familiar to a technician skilled in the art.

Figure 2:
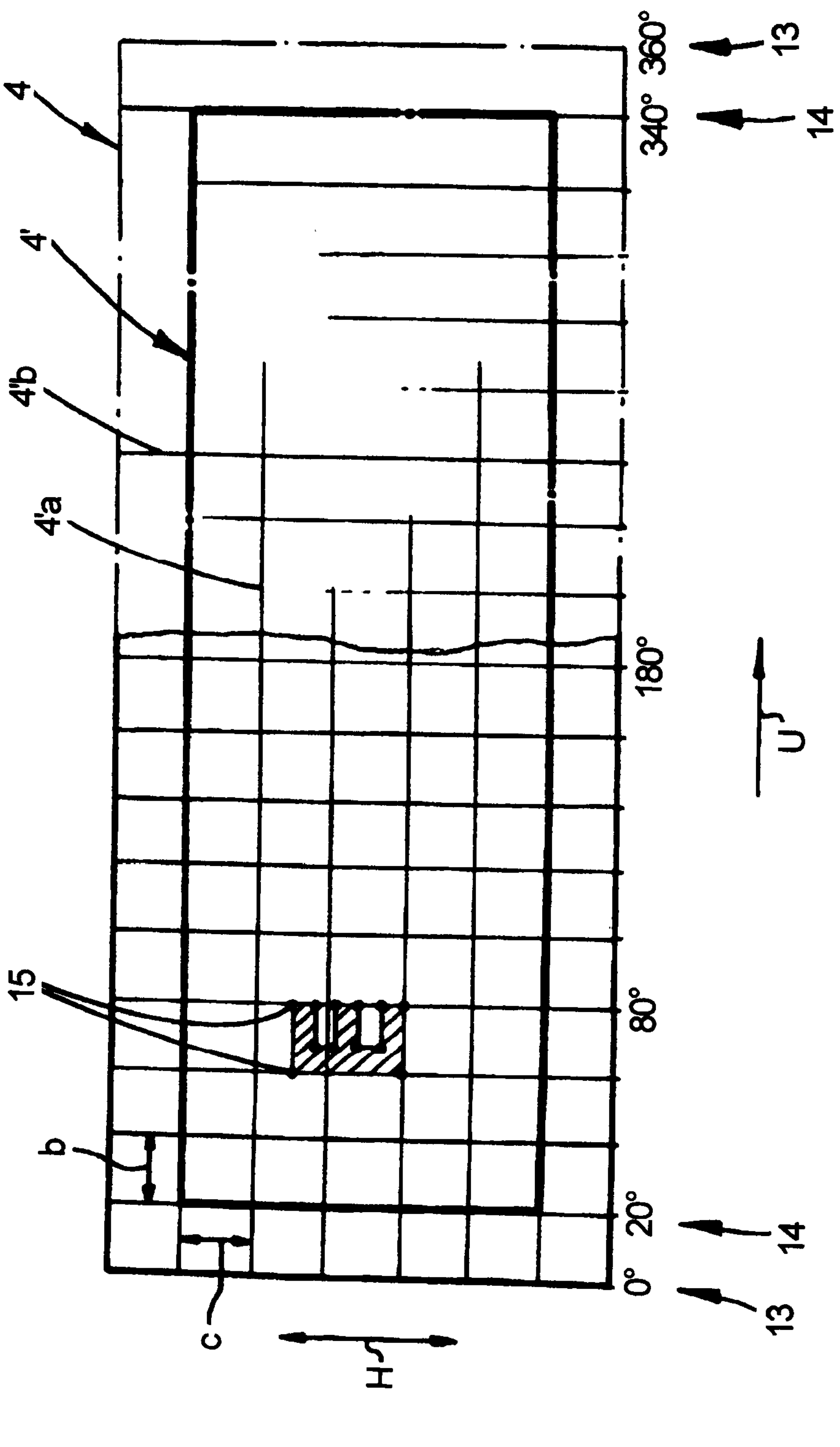
FIG. 2 the artwork and pattern.
Figure 3:
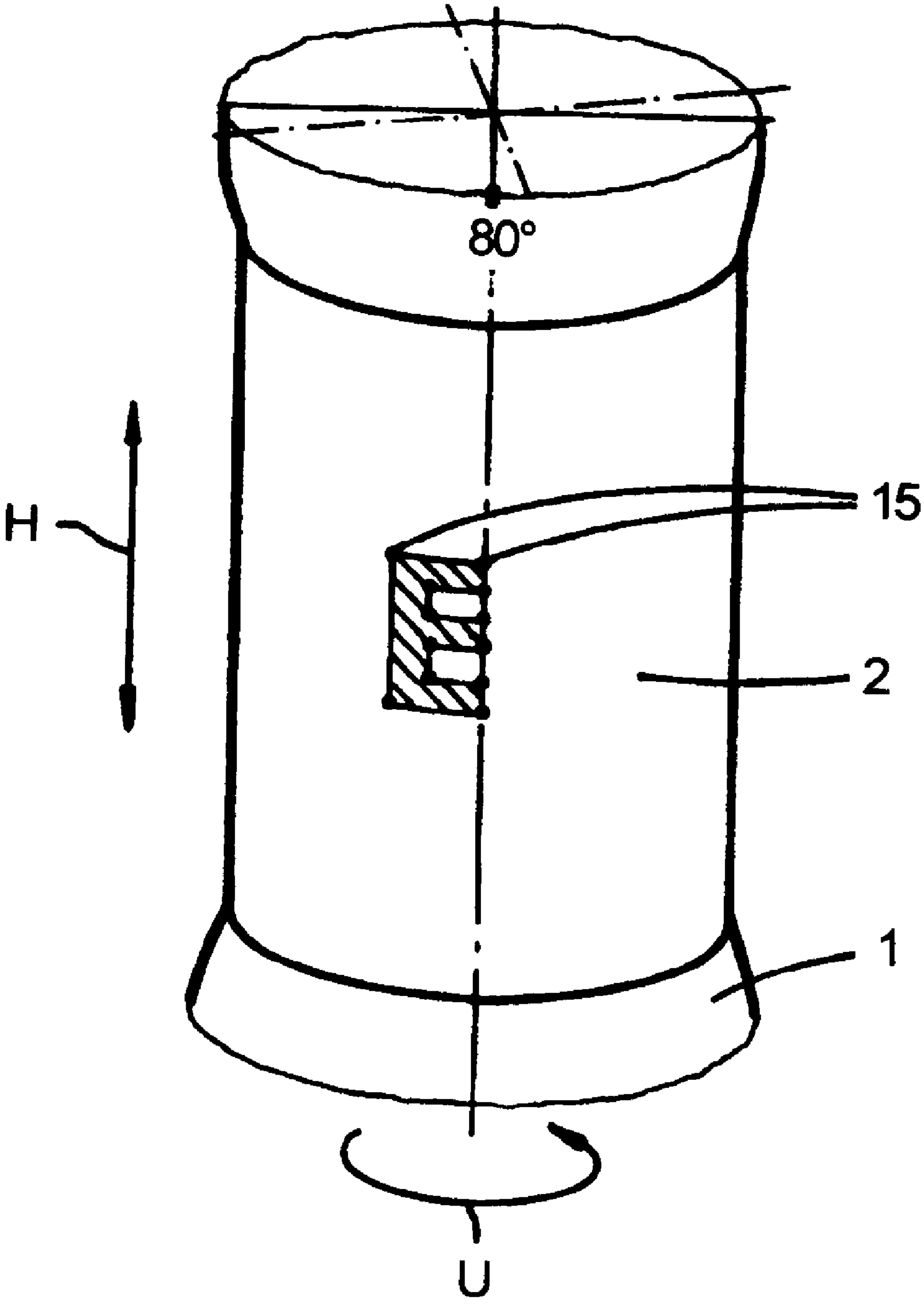
FIG. 3 the label wrapped around the container.

The apparatus also has a print head 3, by means of which the artwork 4' which is illustrated in FIG. 2, and the external dimensions of which are fitted to the circumference of the current container, is printed on an endless label strip 5 where the desired image is produced on the subsequently produced label 2 and consequently on the container 1 as illustrated in FIG. 5. In addition to the print head 3, a belt device 6 is provided which is evacuated and holds the endless strip 5 in position.

The endless strip 5 is cut to the correct length while it is in contact against the belt device 6 to produce the labels 2. For this purpose, a cutting apparatus 7 is provided which cuts the endless strip 5 to the desired length, thereby producing the labels 2. The cutting apparatus 7 is actuated by means of a pattern 4 as illustrated in FIG. 2 to specify the external contours of the label 2 for the current container. It goes without saying that the present application can also be used for the production and processing of other shapes of labels 2, such as ovals, rounds or whatever other shapes are required or desired.

The individual labels 2 that have been separated from one another are transferred from the belt device 6 to a transfer drum 8, where glue is optionally applied to their side that faces the container 1, after which they are wrapped around the container 1 in the known manner. It is apparent that both the transfer drum 8 as well as the belt device 6 and in one possible embodiment the cutting device 7, a feed unit 9 for the endless strip 5 and the print head 3 are actuated and controlled together by a control unit 10.

Also connected to the control unit 10 is a sensor 11 which measures a distance A of the print head 3 from the endless strip 5. The measurement data received in this manner from the sensor 11 with reference to the distance A of the print head 3 from the side of the endless strip 5 to be printed are processed in the control unit 10 as control input variables and in one possible embodiment for the actuation of a support 12 on which the print head 3 is mounted with the objective of keeping the distance A constant or substantially constant. In fact, this support 12 is an adjustable support 12 which is realized in the context of the possible embodiment in the form of a slide 12 which carries the print head 3 on top. Of course a plurality of print heads 3 can also be realized which are located either next to one another or one above another and are optionally supported by the slides 12 in question.

It is also possible in the present application that the artwork 4' and the pattern 4 for the label 2 to be manufactured are each flanked by angle marks 13, 14. FIG. 2 shows that two different angle marks 13, 14 are used. The angle marks 13 correspond to the pattern 4 while the angle marks 14 correspond to the artwork 4'.

Both the artwork 4' as well as the pattern 4 are read into the control unit 10 in the form of matrix surfaces of a specified length in the peripheral direction U and width in the vertical axis direction H of the container 1. Also possible in the present application is that the respective length of the artwork 4' as well as that of the pattern 4 in the circumferential direction U are not necessarily preserved during the generation of the printed image and of the label 2, but undergo a variation. This variation occurs, as described above, as a function of the circumference or the height of the individual container to be labeled.

Both the pattern 4 and the artwork 4' are flanked by the associated angle marks 13, 14. The angle marks 13, 14 are each used for the angle-dependent actuation of the cutting apparatus 7 and the print head 3 in the circumferential direction U of the container 1.

This method is explained in greater detail below, first with reference to the artwork 4'. As described above, the artwork 4' is plotted on the endless label strip 5 by means of the print head 3, and in one possible embodiment generally centrally in comparison to the label 2 to be subsequently manufactured or the pattern 4. First the artwork 4' is identified in the circumferential direction U with an angle range zero degrees to three hundred sixty degrees and provided with the angle marks 14, which in this case cover a total angle of three hundred twenty degrees. For example, there may be one angle mark every twenty degrees.

The pixels 15 that correspond to the angle marks 14 are therefore accurately positioned on the circumference of the container 1 in terms of their correct angle of rotation. In fact, the artwork 4' comprises a grid of pixels 15 which are arranged along circumferential lines 4'$a$ and vertical axis lines 4'$b$. By means of the angle marks 14 it is then essentially ensured or promoted that the pixels 15 in question, taking the circumference of the current container into consideration, appear exactly or substantially exactly in the rotational angle positions corresponding to the angle marks 14 on the label 2 in the form of a printed image and on the container 1 in its entirety. For this purpose the angle marks 14 are evaluated for the actuation of the print head 3 by means of the control unit 10, whereby the increase or decrease of the distances between the individual angle marks as a function of the current container circumference are taken into consideration for the generation of the flat printed image.

Naturally, it must or should thereby be essentially guaranteed or promoted that the artwork 4' in its entirety assumes its specified position in comparison to the pattern 4, and in the illustrated example the angular areas zero degrees to twenty degrees and three hundred forty degrees to three hundred sixty degrees each remain free on the edge of the artwork 4' on the pattern 4.

Figure 4:
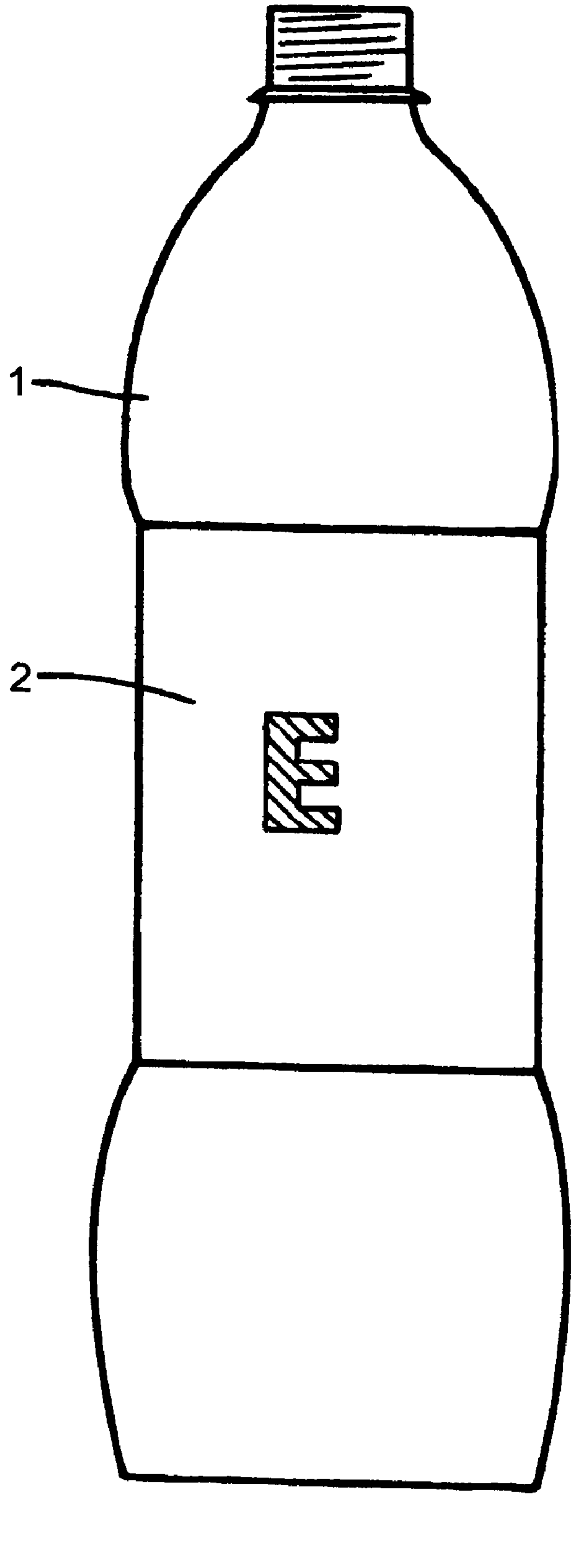
FIG. 4 an overall view of a container provided with the label according to the present application.

The pattern 4 has also first been identified in the circumferential direction U with an angular range from zero degrees to three hundred sixty degrees and is provided with corresponding angle marks 13. The angle marks 13 are also provided every twenty degrees and are used instead of the longitudinal dimension of the pattern 4 in the circumferential direction U for the subsequent actuation of the bottle 1 during the transfer of the individual labels 2 to its circumference. In fact, the individual bottle or container 1 is located on a rotating support or a turntable 16, which is controlled by means of the control unit 10 as a function of the angle marks 13 or 14 respectively. It is thereby essentially ensured or promoted that the leading edge of the pattern 4 and of the label 2 will accurately assume the zero degrees position, while the trailing edge of the pattern 4 and thus of the label 2 corresponds to the three hundred sixty degree rotation of the container 1 by means of the turntable 16. In this manner, the container 1 is provided with a wraparound label 2 as illustrated in FIG. 4 which is applied to the circumference without any overlap.

Like the label or wraparound label 2, the size of the printed image and thus of the artwork 4' can be varied by increasing or decreasing the length in the circumferential direction. For this purpose the pixels 15 are provided at a variable (or fixed) distance b in the circumferential direction U. The distance c between pixels in the vertical axis direction H can also be varied. It is thereby essentially guaranteed or promoted that at least the leading and trailing edge of the pattern and thus of the labels 2 will assume a specified angular position on the circumference of the container 1, as will the pixels of the artwork 4' corresponding to the angle marks 14. Between the angle marks 14 the pixels 15 are generally arranged equidistantly, i.e. at the same distance b from one another.

It goes without saying that the teaching of this present application also includes realizations in which the digital storage of the artwork is accomplished in some manner other than described above. For example, it is possible to store the artwork in the form of an X-Y matrix, whereby each point or each cell of this matrix corresponds to a pixel to be printed. A set of the necessary or desired data such as color, brightness, etc. is identified for each pixel.

The objects of this present application are a method and an apparatus for the circumferential labeling of containers 1, in one possible embodiment for the wraparound labeling of bottles 1. An endless label strip 5 is printed, cut to the desired length to form the individual label 2 and is wrapped around the container 1. The present application teaches that a pattern 4 and/or the artwork 4' for the label are provided with angle marks 13, 14 in the circumferential direction U and/or the vertical axis direction H of the container 1 for the actuation of a cutting apparatus 2 and/or a print head 3 as a function of the angle.

One feature or aspect of an embodiment is believed at the time if the filing of this patent application to possibly reside broadly in a method for the circumferential labeling of containers 1, in one possible embodiment for the wraparound labeling of bottles 1, according to which an endless label strip 5 is printed, then the individual label 2 is cut to length and wrapped around at least part of the circumference of the container 1, characterized in that the circumference and/or the height of at least one container to be labeled is determined by at least one sensor device 17.

One feature or aspect of an embodiment is believed at the time if the filing of this patent application to possibly reside broadly in a method for the circumferential labeling of containers 1, in one possible embodiment for the wraparound labeling of bottles 1, according to which an endless label strip 5 is printed, then the individual label 2 is cut to length and wrapped around at least part of the circumference of the container 1, characterized in that the circumference and/or the height of at least one container to be labeled is determined by at least one sensor device 17, whereupon the individual label 2 is cut to a length that is adapted to the respective container.

Yet another feature or aspect of an embodiment is believed at the time if the filing of this patent application to possibly reside broadly in the method, wherein the artwork 4' is applied to the endless label strip 5 in the form of a printed image by means of the print head 3, whereby the dimensions of the printed image are adjusted to the determined dimensions of the container.

Still another feature or aspect of an embodiment is believed at the time if the filing of this patent application to possibly reside broadly in the method, wherein the length of the label is adapted to the at least one determined container circumference.

A further feature or aspect of an embodiment is believed at the time if the filing of this patent application to possibly reside broadly in the method, wherein a pattern 4 and/or the artwork 4' for the label 2 are provided with angle marks 13, 14 for the actuation of a cutting device 7 and/or of a print head 3 as a function of the angle in the circumferential direction U and/or the vertical axis direction H of the container 1.

Another feature or aspect of an embodiment is believed at the time if the filing of this patent application to possibly reside broadly in the method, wherein the pattern 4 and/or the artwork 4' for the individual label 2 is stored in a control unit 1 and is provided with the angle marks 13, 14.

Yet another feature or aspect of an embodiment is believed at the time if the filing of this patent application to possibly reside broadly in the method, wherein the artwork 4' is applied by means of the print head 3 in the form of a printed image to the endless label strip 5, whereby the print head 3 is at a fixed, specified distance A from the endless label strip 5.

Still another feature or aspect of an embodiment is believed at the time if the filing of this patent application to possibly reside broadly in the method, wherein the distance A of the print head 3 from the endless label strip 5 is set adjustably.

A further feature or aspect of an embodiment is believed at the time if the filing of this patent application to possibly reside broadly in the method, wherein the artwork 4' and/or the pattern 4 are applied individually or both to the container 1 without any overlap.

One feature or aspect of an embodiment is believed at the time if the filing of this patent application to possibly reside broadly in the method, wherein the artwork 4' is applied to the endless label strip 5 perpendicular or virtually perpendicular to the circumferential direction U on the basis of its dimension in the vertical axis direction H.

Another feature or aspect of an embodiment is believed at the time if the filing of this patent application to possibly reside broadly in the method, wherein the artwork 4' is applied to the endless label strip 5 on the basis of the size and shape of the container 1 with different distances b, c between individual pixels 15 in the circumferential direction U and/or the vertical axis direction H.

Yet another feature or aspect of an embodiment is believed at the time if the filing of this patent application to possibly reside broadly in the method, wherein the distance b, c between the pixels 15 in the circumferential direction U and/or the vertical axis direction H is varied or fixed.

Still another feature or aspect of an embodiment is believed at the time if the filing of this patent application to possibly reside broadly in the method, wherein the artwork 4' partly or completely fills the respective pattern 4.

A further feature or aspect of an embodiment is believed at the time if the filing of this patent application to possibly reside broadly in the method for the circumferential labeling of containers 1, in one possible embodiment for the wraparound labeling of bottles 1, in one possible embodiment according to the present application, with a print head 3 for the printing of endless label strip 5 and with a cutting apparatus 7 to cut the endless label strip 5 to length to produce the individual label 2 which is wrapped around the container 1, wherein at least one sensor device 17 is provided for the determination of the circumference and/or the height of a container.

Another feature or aspect of an embodiment is believed at the time if the filing of this patent application to possibly reside broadly in the apparatus, wherein a pattern 4 and/or the artwork 4' for the respective label 1 are provided in a control unit 10 with angle marks 13, 14 for the actuation of a cutting apparatus 7 as a function of the angle in the circumferential direction U and/or the vertical axis direction H of the container 1.

Yet another feature or aspect of an embodiment is believed at the time if the filing of this patent application to possibly reside broadly in the apparatus, wherein the print head 3 is held in an adjustable support 12 and is at a specified distance A from the endless label strip 5.

Still another feature or aspect of an embodiment is believed at the time if the filing of this patent application to possibly reside broadly in the apparatus, wherein a sensor 11 is provided for the measurement of the distance A of the print head 3 from the endless label strip 5, the measurements from which are evaluated as control input variables in the control unit 10 for the actuation of the support 12 to maintain a constant or substantially constant regulated distance A.

A further feature or aspect of an embodiment is believed at the time if the filing of this patent application to possibly reside broadly in a container 1, in one possible embodiment a bottle 1 with a circumferential label 2, which is printed with the artwork 4' and has been separated from an endless label strip 5 in consideration of a pattern 4, wherein the pattern 4 and/or the artwork 4' have been applied in the circumferential direction U and/or the vertical axis direction H of the container 1 as a function of the angle.

One feature or aspect of an embodiment is believed at the time of the filing of this patent application to possibly reside broadly in a method of filling and labeling beverage bottles in a beverage bottling plant for filling bottles with a liquid beverage filling material, the method compensating for a variation in circumference of individual bottles of a nominally similar size to minimize use of labeling material and to provide a substantially consistent aesthetic appearance of continuous uninterrupted artwork all the way around labeled bottles with a non-overlapping label having abutting ends thereby providing a substantially seamless label without a gap for the bottles in a filling run of bottles, the beverage bottling plant comprising: a beverage filling machine comprising a plurality of beverage filling positions, each beverage filling position comprising a beverage filling device for filling bottles with liquid beverage filling material; the filling devices comprising apparatus being configured to introduce a predetermined flow of liquid beverage filling material into the interior of bottles to a substantially predetermined level of liquid beverage filling material; a first conveyor arrangement being configured and disposed to move bottles from a supply of bottles to the filling machine; a closing machine being configured to close filled bottles; a second conveyor arrangement being configured and disposed to transfer filled bottles from the filling machine to the closing machine; a labeling machine being configured to label filled bottles with non-overlapping labels from a strip of labels; and a third conveyor arrangement being configured and disposed to transfer closed bottles from the closing machine to the labeling machine; the method of filling and labeling beverage bottles comprising the steps of: moving bottles to the filling machine with the first conveyor arrangement; filling bottles with a predetermined amount of liquid beverage filling material with the filling devices; transferring filled bottles from the filling machine to the closing machine with the second conveyor arrangement; closing filled bottles with the closing machine; transferring closed bottles from the closing machine to the labeling machine with the third conveyor arrangement; sensing a dimension of the outer periphery of a first bottle to be labeled by the labeling machine; transmitting the sensed dimension of the first bottle to a controller; calculating a circumference of the first bottle from the transmitted dimension; calculating a first label length, the first label length being calculated to dispose the first label about the circumference of the first bottle to provide a non-overlapping label having abutting ends thereby providing a substantially seamless label without a gap for the first bottle; calculating a first printing length of a first label for applying to the outer periphery of the first bottle, the first printing length being equal to or less than the first label length; calculating a first pixel length for printing of the first label, the first pixel length being such that a plurality of first pixels making up the printing on the first label have a substantially equal printing length and the sum of the first pixel printing lengths of the first label substantially equals the first label printing length; feeding label material in strip form to a label printer; printing the plurality of first pixels within the first printing length on the label material being fed in strip form thereto; cutting the first label from the label material being fed in strip form into a first individual label comprising the first plurality of pixels, the first label having substantially the first calculated label length; applying the first label onto the outer periphery surface of the first bottle, the printing lengths of the first pixels being oriented circumferentially about the periphery of the first bottle; sensing a dimension of the outer periphery of a second bottle to be labeled by the labeling machine; transmitting the sensed dimension of the second bottle to a controller; calculating a circumference of the second bottle from the transmitted dimension; calculating a second label length, the second label length being calculated to dispose the second label about the circumference of the second bottle to provide a non-overlapping label having abutting ends thereby providing a substantially seamless label without a gap for the second bottle; calculating a second printing length of a second label for applying to the outer periphery of the second bottle, the second printing length being equal to or less than the second label length; calculating a second pixel length for printing of the second label, the second pixel length being such that a plurality of second pixels making up the printing on the second label have a substantially equal printing length and the sum of the second pixel printing lengths of the second label substantially equals the second label printing length; feeding label material in strip form to a label printer; printing the plurality of second pixels within the second printing length on the label material being fed in strip form thereto; cutting the second label from the label material being fed in strip form into a second individual label comprising the second plurality of pixels, the second label having substantially the second calculated label length; applying the second label onto the outer periphery surface of the second bottle, the printing lengths of the second pixels being oriented circumferentially about the periphery of the second bottle; and repeating the steps of sensing a dimension; transmitting the sensed dimension; calculating a circumference; calculating a label length; calculating a printing length; calculating a pixel length; feeding label material; printing the plurality of pixels; cutting the label; and applying the label, for a run of bottles of a nominally similar size.

A further feature or aspect of an embodiment is believed at the time of the filing of this patent application to possibly reside broadly in a method of filling and labeling beverage bottles in a beverage bottling plant for filling bottles with a liquid beverage filling material, said method compensating for a variation in circumference of individual bottles of a nominally similar size to minimize use of labeling material and to provide a substantially consistent aesthetic appearance of continuous uninterrupted artwork all the way around labeled bottles with a non-overlapping label having abutting ends thereby providing a substantially seamless label without a gap between the abutting ends for the bottles in a filling run of bottles, said beverage bottling plant comprising: a beverage filling machine comprising a plurality of beverage filling positions, each beverage filling position comprising a beverage filling device for filling bottles with liquid beverage filling material; said filling devices comprising apparatus being configured to introduce a predetermined flow of liquid beverage filling material into the interior of bottles to a substantially predetermined level of liquid beverage filling material; a first conveyor arrangement being configured and disposed to move bottles from a supply of bottles to said filling machine; a closing machine being configured to close filled bottles; a second conveyor arrangement being configured and disposed to transfer filled bottles from said filling machine to said closing machine; a labeling machine being configured to label filled bottles with non-overlapping labels from a strip of labels; and a third conveyor arrangement being configured and disposed to transfer closed bottles from said closing machine to said labeling machine; said method of filling and labeling beverage bottles comprising the steps of: moving bottles to said filling machine with said first conveyor arrangement; filling bottles with a predetermined amount of liquid beverage filling material with said filling devices; transferring filled bottles from said filling machine to said closing machine with said second conveyor arrangement; closing filled bottles with said closing machine; transferring closed bottles from said closing machine to said labeling machine with said third conveyor arrangement; sensing, to compensate for manufacturing tolerances, a dimension of the outer periphery of a first bottle to be labeled by said labeling machine; transmitting the sensed dimension of the first bottle to a controller; calculating a circumference of the first bottle from the transmitted dimension, to compensate for manufacturing tolerances; calculating a first label length, to compensate for manufacturing tolerances, the first label length being calculated to dispose the first label about the circumference of the first bottle to provide a non-overlapping label having abutting ends thereby providing a substantially seamless label without a gap for the first bottle; calculating a first printing length, to compensate for manufacturing tolerances, of a first label for applying to the outer periphery of the first bottle, the first printing length being equal to or less than the first label length; calculating, to compensate for manufacturing tolerances, a first pixel length for printing of the first label, the first pixel length being such that a plurality of first pixels making up the printing on the first label have a substantially equal printing length and the sum of the first pixel printing lengths of the first label substantially equals the first label printing length; feeding label material in strip form to a label printer; printing the plurality of first pixels within the first printing length on the label material being fed in strip form thereto; cutting the first label from the label material being fed in strip form into a first individual label comprising the first plurality of pixels, the first label having substantially the first calculated label length; applying the first label onto the outer periphery surface of the first bottle, the printing lengths of the first pixels being oriented circumferentially about the periphery of the first bottle; sensing, to compensate for manufacturing tolerances, a dimension of the outer periphery of a second bottle to be labeled by said labeling machine; transmitting the sensed dimension of the second bottle to a controller; calculating a circumference of the second bottle from the transmitted dimension; calculating a second label length, to compensate for manufacturing tolerances, the second label length being calculated to dispose the second label about the circumference of the second bottle to provide a non-overlapping label having abutting ends thereby providing a substantially seamless label without a gap for the second bottle; calculating a second printing length, to compensate for manufacturing tolerances, of a second label for applying to the outer periphery of the second bottle, the second printing length being equal to or less than the second label length; calculating, to compensate for manufacturing tolerances a second pixel length for printing of the second label, the second pixel length being such that a plurality of second pixels making up the printing on the second label have a substantially equal printing length and the sum of the second pixel printing lengths of the second label substantially equals the second label printing length; feeding label material in strip form to a label printer; printing the plurality of second pixels within the second printing length on the label material being fed in strip form thereto; cutting the second label from the label material being fed in strip form into a second individual label comprising the second plurality of pixels, the second label having substantially the second calculated label length; applying the second label onto the outer periphery surface of the second bottle, the printing lengths of the second pixels being oriented circumferentially about the periphery of the second bottle; and repeating the steps of sensing a dimension; transmitting the sensed dimension; calculating a circumference; calculating a label length; calculating a printing length; calculating a pixel length; feeding label material; printing the plurality of pixels; cutting the label; and applying the label, for a run of bottles of a nominally similar size.

Another feature or aspect of an embodiment is believed at the time of the filing of this patent application to possibly reside broadly in a method of filling and labeling beverage bottles wherein the pixels have a length based on at least one sensed dimension of the container and the pixels have a fixed width.

Yet another feature or aspect of an embodiment is believed at the time of the filing of this patent application to possibly reside broadly in a beverage bottling plant comprising: a sensor configured to sense a dimension of the outer periphery of a bottle to be labeled by the labeling machine; a transmitter configured to transmit the sensed dimension of the bottle to a controller; a controller configured to calculate a circumference of the bottle from the transmitted dimension; the controller also being configured to calculate a label length, the label length being calculated to dispose the label about the circumference of the bottle at a predetermined angular position of the first end with respect to the second end; the controller also being configured the transmit the calculated label length to a cutting arrangement, the controller also being configured to calculate a printing length of a label for applying to the outer periphery of the bottle, the printing length being equal to or less than the label length; the controller also being configured to calculate a pixel length for printing of the label, the pixel length being such that a plurality of pixels making up the printing on the label have a substantially equal printing length and the sum of the pixel printing lengths of the label substantially equals the label printing length; a label feeding arrangement configured to feed label material in strip form to a label printer; a label printer configured to print a plurality of first pixels within the printing length on the label material being fed in strip form thereto; a label cutting arrangement configured to cut labels from the label material being fed in strip form into individual labels comprising the plurality of pixels, the label having substantially the calculated label length; and a label applying apparatus being configured to apply labels onto the outer periphery surface of the first bottle, the printing lengths of the first pixels being oriented circumferentially about the periphery of the bottles.

Still another feature or aspect of an embodiment is believed at the time of the filing of this patent application to possibly reside broadly in a method of operating a labeling machine in a container filling plant, the method compensating for a variation in circumference of individual containers of a nominally similar size to minimize use of labeling material in a filling run of containers, the method comprising the steps of: sensing a dimension of a first container to be labeled; calculating a first label length based upon the sensed dimension, the label length being configured to dispose a first and a second end of the label about the circumference of the container at a predetermined angular position of the first end with respect to the second end; transmitting the first label length for the first container to be labeled to a label cutting apparatus; feeding label material in strip form to a label printer; printing an individual label for the first container to be labeled on the label material being fed thereto in strip form; cutting an individual first label for the first container to be labeled with the cutting apparatus to the calculated length, the length of the individual first label being cut, substantially equals the transmitted label length for the first container to be labeled; applying the individually cut label for the first container to be labeled to the first container such that the length of the individually cut label wraps around at least part of the circumference of the first container; sensing a dimension of a second container to be labeled; calculating a second label length based upon the sensed dimension, the label length being configured to dispose a first and a second end of the label about the circumference of the container at a predetermined angular position of the first end with respect to the second end; transmitting the second label length for the second container to be labeled to a label cutting apparatus; feeding label material in strip form to a label printer; printing an individual label for the second container to be labeled on the label material being fed thereto in strip form; cutting an individual second label for the second container to be labeled with the cutting apparatus to the calculated length, the length of the individual second label being cut, substantially equals the transmitted label length for the second container to be labeled; applying the individually cut label for the second container to be labeled to the second container such that the length of the individually cut label wraps around at least part of the circumference of the second container; and repeating the method steps for labeling subsequent containers in the filling run of containers.

A further feature or aspect of an embodiment is believed at the time of the filing of this patent application to possibly reside broadly in a labeling machine comprising: a sensor configured to sense a dimension of a container to be labeled; a controller configured to calculate a label length based upon the sensed dimension, the label length being configured to dispose a first and a second end of the label about the circumference of the container at a predetermined angular position of the first end with respect to the second end; a transmitter configured to transmit the label length for the container to be labeled to a label cutting apparatus; a label material feeding arrangement configured to feed label material in strip form to a label printer; a label printer configured to print an individual label for the container to be labeled on the label material being fed thereto in strip form; a label cutting arrangement configured to cut an individual label for the container to be labeled with the cutting apparatus to the calculated length, the length of the individual label being cut, substantially equals the transmitted label length for the container to be labeled; and a label applying apparatus configured to apply the individually cut label for the container to be labeled to the container such that the length of the individually cut label wraps around at least part of the circumference of the container.

Another feature or aspect of an embodiment is believed at the time of the filing of this patent application to possibly reside broadly in a labeling machine comprising a print head located at a fixed, specified distance from the label material in strip form.

Yet another feature or aspect of an embodiment is believed at the time of the filing of this patent application to possibly reside broadly in a labeling machine comprising a print head that is set adjustably at a distance from the label material in strip form.

Still another feature or aspect of an embodiment is believed at the time of the filing of this patent application to possibly reside broadly in a method of operating a labeling machine wherein the printing is applied to the label material in strip form by means of a print head, whereby at least one dimension of the printing is adjusted to at least one dimension of the container.

A further feature or aspect of an embodiment is believed at the time of the filing of this patent application to possibly reside broadly in a method of operating a labeling machine wherein a pattern of the printing for the label is provided with angle marks for the actuation of a cutting device and/or of a print head as a function of the angle in a sensed circumferential direction and/or vertical axis direction of the container, the angle marks designate the length and width of pixels making up the printing on the label.

Another feature or aspect of an embodiment is believed at the time of the filing of this patent application to possibly reside broadly in a method of operating a labeling machine wherein the printing is applied to the label in strip form perpendicular to a longitudinal axis of the strip of label material on the basis of a sensed dimension of a vertical axis of the container.

Yet another feature or aspect of an embodiment is believed at the time of the filing of this patent application to possibly reside broadly in a method of operating a labeling machine wherein the printing is applied to the label material in strip form with individual pixels, the pixels have length or width based on at least one sensed dimension of the container.

Still another feature or aspect of an embodiment is believed at the time of the filing of this patent application to possibly reside broadly in a method of operating a labeling machine wherein the printing is applied to the label material in strip form with individual pixels, the pixels have a fixed length or width.

A further feature or aspect of an embodiment is believed at the time of the filing of this patent application to possibly reside broadly in a method of operating a labeling machine wherein the printing on the cut label substantially fills the cut label.

Another feature or aspect of an embodiment is believed at the time of the filing of this patent application to possibly reside broadly in a method of operating a labeling machine wherein the cutting of individual labels at the calculated label length provides a non-overlapping label having abutting ends thereby providing a substantially seamless label without a gap for the container.

Yet another feature or aspect of an embodiment is believed at the time of the filing of this patent application to possibly reside broadly in a method of operating a labeling machine comprising calculating a label printing length of the label for applying to the outer periphery of the container, the printing length being equal to or less than the label length.

Still another feature or aspect of an embodiment is believed at the time of the filing of this patent application to possibly reside broadly in a method of operating a labeling machine further comprising: calculating a pixel length for printing of the label, the pixel length being such that a plurality of pixels making up the printing on the label have a substantially equal printing length and the sum of the pixel printing lengths of the label substantially equals a label printing length.

A further feature or aspect of an embodiment is believed at the time of the filing of this patent application to possibly reside broadly in a method of operating a labeling machine, the method compensating for a variation in at least one dimension of individual containers, the method comprising the steps of: sensing at least one dimension of a first container to be labeled; calculating a first label length based upon the at least one sensed dimension, the label length being configured to dispose a first and a second end of the label about the circumference of the container at a predetermined angular position of the first end with respect to the second end; transmitting the first label length for the first container to be labeled to a label cutting apparatus; feeding label material in strip form to a label printer; printing an individual label for the first container to be labeled on the label material being fed thereto in strip form; cutting an individual first label for the first container to be labeled with the cutting apparatus to the calculated length, the length of the individual first label being cut, substantially equals the transmitted label length for the first container to be labeled; applying the individually cut label for the first container to be labeled to the first container such that the length of the individually cut label wraps around at least part of the circumference of the first container; sensing at least one dimension of a second container to be labeled; calculating a second label length based upon the at least one sensed dimension, the label length being configured to dispose a first and a second end of the label about the circumference of the container at a predetermined angular position of the first end with respect to the second end; transmitting the second label length for the second container to be labeled to a label cutting apparatus; feeding label material in strip form to a label printer; printing an individual label for the second container to be labeled on the label material being fed thereto in strip form; cutting an individual second label for the second container to be labeled with the cutting apparatus to the calculated length, the length of the individual second label being cut, substantially equals the transmitted label length for the second container to be labeled; and applying the individually cut label for the second container to be labeled to the second container such that the length of the individually cut label wraps around at least part of the circumference of the second container; and continuing the process for subsequent containers.

Another feature or aspect of an embodiment is believed at the time of the filing of this patent application to possibly reside broadly in a method of operating a labeling machine further comprising at least one of (I), (II), (III), (IV), (V), (VI), (VII), (VIII), (IX), (X), (XII), (XIII), and (XIV), wherein: (I) the printing is applied to the label material in strip form by means of a print head, whereby at least one dimension of the printing is adjusted to the at least one dimension of the container; (II) the length of the label is adapted to at least one dimension of the container circumference; (III) a pattern of the printing for the label is provided with angle marks for the actuation of a cutting device and/or of a print head as a function of the angle in the circumferential direction and/or the vertical axis direction of the container, the angle marks designate the length and width of pixels making up the printing on the label; (IV) a pattern of the printing for the individual labels and angle marks designating the length and width of pixels making up the pattern are stored in a control unit; (V) the printing is applied by means of a print head in the form of a printed image to the label material in strip form, whereby the print head is at a fixed, specified distance from the label material in strip form; (VI) the printing is applied by means of a print head in the form of a printed image to the label material in strip form, whereby the print head is set adjustably at a distance from the label material in strip form; (VII) the label is applied to the container without any overlap on the container; (VIII) the printing is applied to the label in strip form perpendicular to the longitudinal axis of the strip of label material on the basis of a sensed dimension of the vertical axis of the container; (IX) the printing is applied to the label material in strip form with individual pixels, the pixels have length or width based on the at least one sensed dimension of the container; (X) the printing is applied to the label material in strip form with individual pixels, the pixels have a fixed length or width; (XI) the printing on the cut label substantially fills the cut label; (XII) the cutting of individual labels at the calculated label length to provide a non-overlapping label having abutting ends thereby providing a substantially seamless label without a gap for the container; (XIII) calculating a label printing length of the label for applying to the outer periphery of the container, the printing length being equal to or less than the label length; and (XIV) calculating a pixel length for printing of the label, the pixel length being such that a plurality of pixels making up the printing on the label have a substantially equal printing length and the sum of the pixel printing lengths of the label substantially equals a label printing length.

Yet another feature or aspect of an embodiment is believed at the time of the filing of this patent application to possibly reside broadly in a labeling machine comprising: a sensor configured to sense at least one dimension of a container to be labeled; a controller configured to calculate a label length based upon the at least one sensed dimension, the label length being configured to dispose a first and a second end of the label about the circumference of the container at a predetermined angular position of the first end with respect to the second end; a transmitter configured to transmit the label length for the container to be labeled to a label cutting arrangement; a label material feeding arrangement configured to feed label material in strip form to a label printer; a label printer configured to print an individual label for the container to be labeled on the label material being fed thereto in strip form; a label cutting arrangement configured to cut an individual label for the container to be labeled to the calculated length, the length of the individual label being cut, substantially equals the transmitted label length for the container to be labeled; and a label applying apparatus configured to apply the individually cut label for the container to be labeled to the container such that the length of the individually cut label wraps around at least part of the circumference of the container.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

Some examples of bottling systems, which may be used or adapted for use in at least one possible embodiment of the present may be found in the following U.S. patents assigned to the Assignee herein, namely: U.S. Pat. Nos. 4,911,285; 4,944,830; 4,950,350; 4,976,803; 4,981,547; 5,004,518; 5,017,261; 5,062,917; 5,062,918; 5,075,123; 5,078,826; 5,087,317; 5,110,402; 5,129,984; 5,167,755; 5,174,851; 5,185,053; 5,217,538; 5,227,005; 5,413,153; 5,558,138; 5,634,500; 5,713,403; 6,276,113; 6,213,169; 6,189,578; 6,192,946; 6,374,575; 6,365,054; 6,619,016; 6,474,368; 6,494,238; 6,470,922; and 6,463,964.

Some examples of cameras or the like optical monitoring apparatus that may possibly be utilized or possibly adapted for use in at least one possible embodiment of the present application may possibly be found in the following U.S. patents: U.S. Pat. No. 5,233,186 issued to Ringlien on Aug. 3, 1993; U.S. Pat. No. 5,243,400 issued to Ringlien on Sep. 7, 1993; U.S. Pat. No. 5,369,713 issued to Schwartz et al. on Nov. 29, 1994; U.S. Pat. No. 5,442,446 issued to Gerber et al. on Aug. 15, 1995; U.S. Pat. No. 5,661,295 issued to Buchmann et al. on Aug. 26, 1997; and U.S. Pat. No. 5,898,169 issued to Nodbryhn on Apr. 27, 1999.

Some examples of position sensors or position sensor systems that may be used or adapted for use in at least one possible embodiment of the present invention may be found in the following U.S. patents: U.S. Pat. No. 5,794,355, issued to inventor Nickum on Aug. 18, 1998; U.S. Pat. No. 5,520, 290, issued to inventors Kumar et al. on May 28, 1996; U.S. Pat. No. 5,074,053, issued to inventor West on Dec. 24, 1991; and U.S. Pat. No. 4,087,012, issued to inventor Fogg on May 2, 1978.

Some examples of laser printing arrangements that may possibly be utilized or possibly adapted for use in at least one possible embodiment of the present application may possibly be found in the following U.S. patents: U.S. Pat. No. 4,847, 643 issued to Ohmori on Jul. 11, 1989; U.S. Pat. No. 5,294, 945 issued to Omura et al. on Mar. 15, 1994; U.S. Pat. No. 5,528,280 issued to Endo et al. on Jun. 18, 1996; U.S. Pat. No. 6,210,778 issued to Poirier et al. on Apr. 3, 2001; U.S. Pat. No. 6,433,810 issued to Katayama et al. on Aug. 13, 2002; and U.S. Pat. No. 6,655,275 issued to Mugrauer on Dec. 2, 2003.

Some examples of ink jet printing apparatus and methods that may possibly be utilized or possibly adapted for use in at least one possible embodiment of the present application may possibly be found in the following U.S. patents: U.S. Pat. No. 6,582,047 issued to Koitabashi et al. on Jun. 24, 2003; U.S. Pat. No. 6,623,093 issued to Takahashi et al. on Sep. 23, 2003; U.S. Pat. No. 6,625,351 issued to Cox et al. on Sep. 23, 2003; U.S. Pat. No. 6,652,055 issued to Oikawa on Nov. 25, 2003; U.S. Pat. No. 6,669,767 issued to Blease et al. on Dec. 30, 2003; and U.S. Pat. No. 6,688,739 issued to Murray on Feb. 10, 2004

Some examples of apparatus and methods for the drying and/or hardening of ink that may possibly be utilized or adapted for use in at least one possible embodiment may possibly be found in the following U.S. patents: U.S. Pat. No. 6,493,018, ent it led "Wide format thermal printer"; U.S. Pat. No. 6,957,030, entitled "Method and apparatus for making signs"; U.S. Pat. No. 4,970,528, ent it led "Method for uniformly drying inkon paper from an ink jet printer"; U.S. Pat. No. 6,312,123, ent it led "Method and apparatus for UV ink jet printing on fabric and combination printing and quilting thereby"; and U.S. Pat. No. 6,857,737, entitled "UV ink printed graphic article".

Some examples of laser cutting apparatus and methods that may possibly be utilized or adapted for use in at least one possible embodiment may possibly be found in the following U.S. patents: U.S. Pat. No. 6,191,382 B, entitled "Dynamic Laser Cutting Apparatus"; No. 2003/0207062A1, entitled "Laser-Cut table Multi-Layer Sheet Material"; U.S. Pat. No. 5,614,278 ent it led "Strip of Separable Labels or Tags Having a Display Surface for Display of Information Thereon"; U.S. Pat. No. 4,189,337, entitled "Real Time Labeler System"; and U.S. Pat. No. 2004/0226659 A1, entitled "Label Application System".

Some examples of blade cutting apparatus and methods that may possibly be utilized or adapted for use in at least one possible embodiment may possibly be found in the following U.S. patent application publications: No. 2003/0146943 A1, entitled "Label Printer-Cutter with Mutually Exclusive Printing and Cutting Operation"; U.S. Pat. No. 5,614,278 entitled "Strip of Separable Labels or Tags Having a Display Surface for Display of Information Thereon"; U.S. Pat. No. 4,189, 337, entitled "Real Time Labeler System"; No. 2004/ 0226659 A1, entitled "Label Application System"; and No. 2004/0226659 A1, entitled "Label Application System".

Some examples of adhesive applicators that may possibly be utilized or possibly adapted for use in at least one possible embodiment of the present application may possibly be found in the following U.S. patents: U.S. Pat. No. 5,700,322 issued to Fort on Dec. 23, 1997 U.S. Pat. No. 5,862,986 issued to Bolyard, Jr. et al. on Jan. 26, 1999; U.S. Pat. No. 6,076,711 issued to McGuffey on Jun. 20, 2000; U.S. Pat. No. 6,168,049 issued to Bollard, Jr. on Jan. 2, 2001; U.S. Pat. No. 6,499,631 issued to Zook on Dec. 31, 2002; and U.S. Pat. No. 6,592,281 issued to Clark et al. on Jul. 15, 2003. Some examples of self-adhesive labels that may possibly be utilized or adapted for use in at least one possible embodiment may possibly be found in the following U.S. patents: U.S. Pat. No. 5,614,278 entitled "Strip of Separable Labels or Tags Having a Display Surface for Display of Information Thereon"; No. 2004/ 0157026 A1, entitled "Self-Adhesive Labels and Manufacture Thereof"; No. 2004/0028932 A1, entitled "Label Film with Improved Adhesion"; and No. 2003/0207062 A1, entitled "Laser-Cut table Multi-Layer Sheet Material".

Some examples of labeling apparatus and methods that may possibly be utilized or adapted for use in at least one possible embodiment may possibly be found in the following U.S. patents: U.S. Pat. No. 4,189,337, entitled "Real Time Labeler System"; No. 2004/0226659 A1, entitled "Label Application System"; U.S. Pat. No. 6,191,382 B1, entitled "Dynamic Laser Cutting Apparatus"; No. 2003/0146943 A1, entitled "Label Printer-Cutter with Mutually Exclusive Printing and Cutting Operation"; and No. 2002/0029855 A1, entitled "System for Printing and Applying Tape onto Surfaces"; U.S. Pat. No.: U.S. Pat. No. 6,634,400, entitled "Labeling machine;" U.S. Pat. No. 6,561,246, entitled "Labeling machine capable of precise attachment of a label to different sizes of containers;" U.S. Pat. No. 6,550,512, entitled "Labeling machine capable of preventing erroneous attachment of labels on containers;" U.S. Pat. No. 6,378,587, entitled "Cylindrical container labeling machine;" U.S. Pat. No. 6,328,086, entitled "Labeling machine;" U.S. Pat. No. 6,315,021, entitled "Labeling machine;" U.S. Pat. No. 6,199,614, entitled "High speed labeling machine having a constant tension driving system;" U.S. Pat. No. 6,167,935, entitled "Labeling machine; U.S. Pat. No. 6,066,223, entitled "Labeling machine and method; U.S. Pat. No. 6,050,319, entitled "Non-round container labeling machine and method;" and U.S. Pat. No. 6,045,616, entitled "Adhesive station and labeling machine."

Some examples of computer systems that may possibly be utilized or possibly adapted for use in at least one possible embodiment of the present application may possibly be found in the following U.S. patents: U.S. Pat. No. 5,416,480 issued to Roach et al. on May 16, 1995; U.S. Pat. No. 5,479,355 issued to Hyduke on Dec. 26, 1995; U.S. Pat. No. 5,481,730 issued to Brown et al. on Jan. 2, 1996; U.S. Pat. No. 5,805,094 issued to Roach et al. on Sep. 8, 1998; U.S. Pat. No. 5,881,227 issued to Atkinson et al. on Mar. 9, 1999; and U.S. Pat. No. 6,072,462 issued to Moshovich on Jun. 6, 2000.

The following patents, patent applications or patent publications, are hereby incorporated by reference as if set forth in their entirety herein: DE 199 21 843 A1, having the following English translation of the German title "cutting aggregate for beverage container labeling machine, having control arrangement which controls laser beam to produce desired contour of cut edges," published on Nov. 23, 2000; DE 197 16 079, having the following English translation of the German title "METHOD OF LABELING BOTTLES," published on Apr. 9, 1998.

All of the patents, patent applications or patent publications, which were cited in the International Search Report dated Dec. 3, 2007, and/or cited elsewhere are hereby incorporated by reference as if set forth in their entirety herein as follows: DE 20 2006 000214, having the following English translation of the German title "BOTTLE LABELING MACHINE PRODUCES LABELS FROM STRIP OF MATERIAL USING PRINTER BUILT INTO LABELING STATION WHICH IS CONTROLLED BY SEPARATE ELECTRONIC CONTROL UNIT," published on Apr. 20, 2006; US 2006/037706, having the title "BEVERAGE BOTTLE LABELING APPARATUS CONFIGURED TO LABEL BEVERAGE BOTTLES IN A BEVERAGE BOTTLING PLANT," published on Feb. 23, 2006; DE 101 15 543, having the following English translation of the German title "method and device for packing containers with labels involves printing alignment marks on labels during controlled transport of latter," published on Oct. 17, 2002; DE 198 32 548, having the following English translation of the German title "DESIGNATING DIFFERENT TYPE WARES OR GOODS USING AT LEAST ONE SENSOR WHICH PREF. IDENTIFIES GEOMETRIC CHARACTERISTIC OF WARE," published on Jan. 27, 2000; EP 1 038 782, having the title "IN LINE PRODUCTION OF SOLID OBJECTS," published on Sep. 27, 2000; EP 1 621 465, having the title "LINERLESS LABEL APPLICATION ASSEMBLY," published on May 17, 2006; and US 2005/045263, having the title "DEVICE FOR APPLICATION OF LABELS TO CONTAINERS," published on Mar. 3, 2005.

All of the patents, patent applications or patent publications, which were cited in the German Office Action dated Mar. 5, 2007, and/or cited elsewhere are hereby incorporated by reference as if set forth in their entirety herein as follows: DE 20 2006 000214, having the following English translation of the German title "BOTTLE LABELING MACHINE PRODUCES LABELS FROM STRIP OF MATERIAL USING PRINTER BUILT INTO LABELING STATION WHICH IS CONTROLLED BY SEPARATE ELECTRONIC CONTROL UNIT," published on Apr. 20, 2006; and CH 692 567, having the following English translation of the German title "CHEESE ROUND LABELING MACHINE," published on Aug. 15, 2002.

U.S. patent application Ser. No. 12/255,876, filed on Oct. 22, 2008, having inventor Volker TILL, and title METHOD AND DEVICE FOR LABELING CONTAINERS, and its corresponding Federal Republic of Germany Patent Application No. 10 2006 019 441.1, filed on Apr. 24, 2006, and International Patent Application No. PCT/EP2007/002999, filed on Apr. 3, 2007, having WIPO Publication No. WO 2007/121835 and inventor Volker TILL are hereby incorporated by reference as if set forth in their entirety herein.

U.S. patent application Ser. No. 12/202,610, filed on Sep. 2, 2008, having inventor Volker TILL, and title METHOD OF OPERATING A MULTIPLE CONTAINER SHRINK WRAPPING MACHINE HAVING A PRINTING ARRANGEMENT TO PRINT ON THE SHRINK WRAP MATERIAL SIMULTANEOUSLY WHILE WRAPPING CONTAINERS AND A MULTIPLE CONTAINER SHRINK WRAPPING MACHINE THEREFOR, and its corresponding Federal Republic of Germany Patent Application No. 10 2006 009 348.8, filed on Mar. 1, 2006, and International Patent Application No. PCT/EP2007/000888, filed on Feb. 2, 2007, having WIPO Publication No. WO 2007/101517 and inventor Volker TILL are hereby incorporated by reference as if set forth in their entirety herein.

The "Tonejet" printhead, developed by The Technology Partnership plc, is an example of a printhead which may possibly be utilized or adapted for use in at least one possible embodiment. Some examples of printheads that may possibly be utilized or adapted for use in at least one possible embodiment may possibly be found in the following U.S. patents: U.S. Pat. No. 7,387,366, issued Jun. 17, 2008, entitled "Printhead;" U.S. Pat. No. 6,820,965, issued Nov. 23, 2004, entitled "Drop-on-Demand Printer;" U.S. Pat. No. 7,407,271, issued Aug. 5, 2008, entitled "Self-Cooling Thermal Ink Jet Printhead;" and U.S. Pat. No. 7,380,906, issued Jun. 3, 2008, entitled "Printhead."

The patents, patent applications, and patent publications listed above, beginning in the paragraph with the phrase: "Some examples of bottling systems . . . " and ending in the paragraph with the phrase: ". . . issued Jun. 3, 2008, entitled "Printhead." are herein incorporated by reference as if set forth in their entirety. The purpose of incorporating U.S. patents, Foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

The corresponding foreign and international patent publication applications, namely, Federal Republic of Germany Patent Application No. 10 2006 038 249.8, filed on Aug. 16, 2006, having inventor Volker TILL, and DE-OS 10 2006 038 249.8 and DE-PS 10 2006 038 249.8, and International Application No. PCT/EP2007/007190, filed on Aug. 15, 2007, having WIPO Publication No. WO 2008/019830 and inventor Volker TILL, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

The purpose of incorporating the Foreign equivalent patent application PCT/EP2007/007190 and German Patent Application 10 2006 038 249.8 is solely for the purpose of providing a basis of correction of any wording in the pages of the present application, which may have been mistranslated or misinterpreted by the translator. Words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned word in this sentence, when not used to describe technical features of one or more embodiments, are not generally considered to be incorporated by reference herein.

Statements made in the original foreign patent applications PCT/EP2007/007190 and DE 10 2006 038 249.8 from which this patent application claims priority which do not have to do with the correction of the translation in this patent application are not to be included in this patent application in the incorporation by reference.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

> A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A method for the circumferential, wraparound labeling of containers comprising bottles or other such containers, the dimensions of which may vary from container to container within manufacturing tolerance, to thus provide a consistent appearance of the labeled containers, said method comprising:

sensing at least one of: a circumference and a height of a container;

determining a length and/or a height of an individual label to be cut which corresponds to the sensed circumference and/or height of said container;

printing label information on an endless strip;

cutting an individual label for said container to the determined length and/or height;

wrapping said cut label around at least a part of the circumference of said container; and repeating the above steps for additional containers to compensate for manufacturing tolerance of the additional containers and providing a consistent labeled appearance for the additional containers.

2. The method according to claim 1, wherein said wrapping comprises wrapping said cut label about said container without any overlap of any portions of said cut label.

3. The method according to claim 2, wherein said wrapping comprises wrapping said cut label about said container and abutting edges of said cut label to one another.

4. The method according to claim 3, wherein said label information comprises an image, and said printing comprises adjusting dimensions of said image to correspond to the sensed circumference and/or height of said container, and then using a print head to print said image on said endless strip.

5. The method according to claim 4, wherein said image is provided with angle marks for the actuation of a cutting device and/or of a print head as a function of the angle in the circumferential direction and/or the vertical axis direction of said container.

6. The method according to claim 5, wherein the image is stored in a control unit and is provided with the angle marks.

7. The method according to claim 6, wherein said print head is at a fixed, specified distance from said endless strip, or the distance of said print head from said endless strip is set adjustably.

8. The method according to claim 7, wherein said printed image comprises both artwork and a pattern, which are applied individually or both to the container without any overlap.

9. The method according to claim 8, wherein one of (i), (ii), (iii):

(i) said artwork is applied to said endless strip perpendicular to the circumferential direction on the basis of its dimension in the vertical axis direction;

(ii) said artwork is applied to said endless strip perpendicular to the circumferential direction on the basis of its dimension in the vertical axis direction; and said artwork is applied to said endless label strip on the basis of the size and shape of the container, and wherein there are different distances between individual pixels in the circumferential direction and/or the vertical axis direction, or the distances between the pixels in the circumferential direction and/or the vertical axis direction is varied or fixed;

(iii) said artwork is applied to said endless strip perpendicular to the circumferential direction on the basis of its dimension in the vertical axis direction;

said artwork is applied to said endless label strip on the basis of the size and shape of the container, and wherein there are different distances between individual pixels in the circumferential direction and/or the vertical axis direction, or the distances between the pixels in the circumferential direction and/or the vertical axis direction is varied or fixed; and said artwork partly or completely fills said pattern.

10. The method according to claim 9, wherein:

said artwork is applied to said endless strip perpendicular to the circumferential direction on the basis of its dimension in the vertical axis direction;

said artwork is applied to said endless label strip on the basis of the size and shape of the container, and wherein there are different distances between individual pixels in the circumferential direction and/or the vertical axis direction, or the distances between the pixels in the circumferential direction and/or the vertical axis direction is varied or fixed;

said artwork partly or completely fills said pattern; and said artwork is provided with one set of angle marks, and said pattern is provided with another set of angle marks.

11. The method according to claim 10, wherein said method steps are performed for a run of containers of a same nominal size.

12. The method according to claim 11, wherein said containers comprise blow-molded plastic containers.

13. The method according to claim 1, wherein said method steps are performed for a run of containers of a same nominal size.

14. The method according to claim 13, wherein said containers comprise blow-molded plastic containers.

15. The method according to claim 14, wherein said wrapping comprises wrapping said cut label about said container without any overlap of any portions of said cut label.

16. The method according to claim 15, wherein said wrapping comprises wrapping said cut label about said container and abutting edges of said cut label to one another.

17. The method according to claim 16, wherein said wrapping comprises wrapping said cut label about said container and abutting cut edges of said cut label to one another.

* * * * *